May 14, 1963   E. G. HUSCHKE, JR., ET AL   3,089,769
NICKEL-CHROMIUM-PALLADIUM BRAZING ALLOY
Filed March 11, 1960
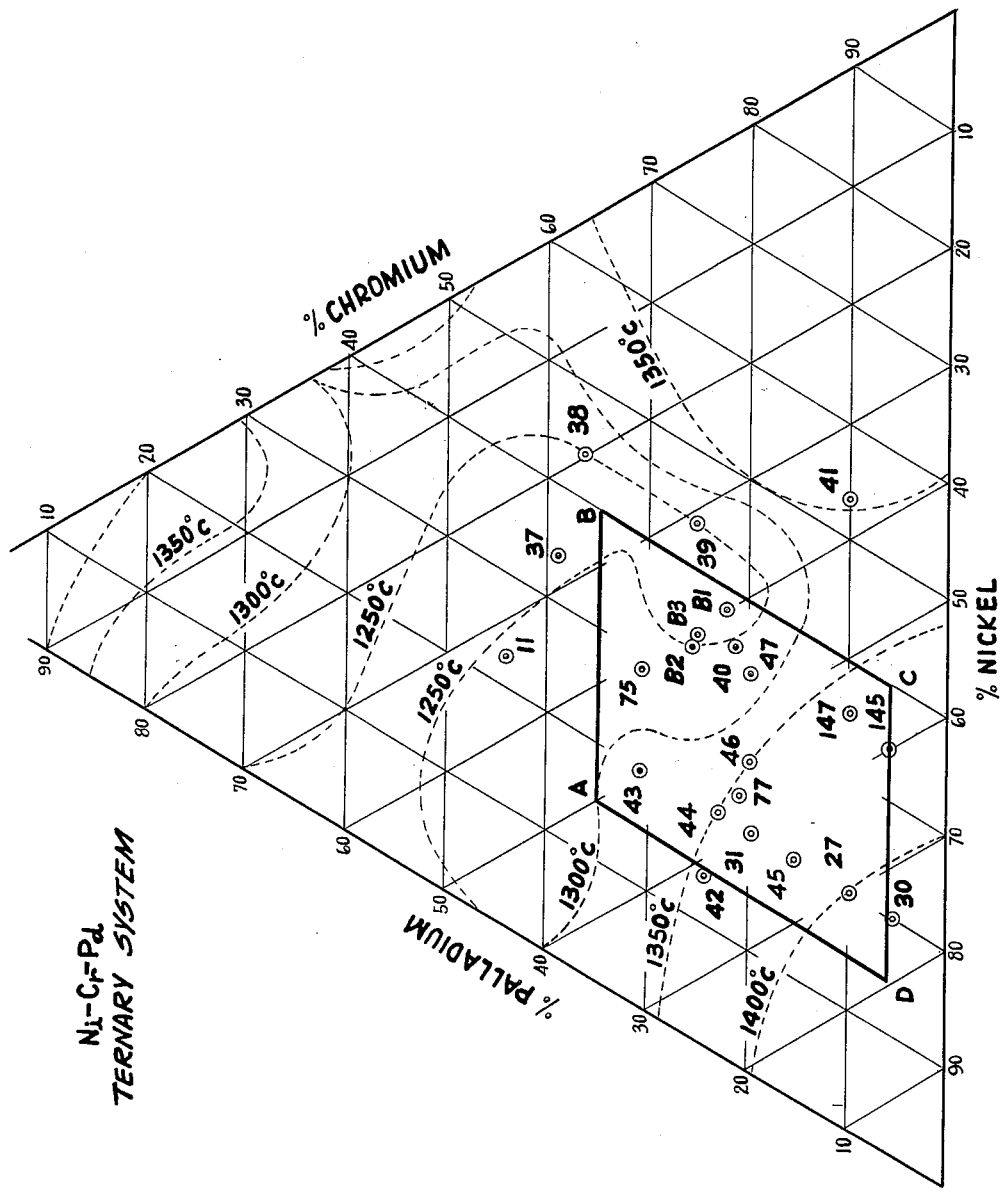
INVENTORS:
ERNST G. HUSCHKE, JR.
WILLIAM R. BLACKHAM
PAUL R. MOBLEY
BY Lee H. Sachs
ATTORNEY- 3,089,769
NICKEL-CHROMIUM-PALLADIUM BRAZING ALLOY
Ernst George Huschke, Jr., Paul Ray Mobley, and William Roland Blackham, Cincinnati, Ohio, assignors to General Electric Company, a corporation of New York
Filed Mar. 11, 1960, Ser. No. 14,338
8 Claims. (Cl. 75—171)

This invention relates to a nickel-chromium-palladium brazing alloy particularly useful for high temperature applications.

Practical use of refractory metals and their alloys as well as nickel, iron and cobalt base "superalloys" as structural components in high temperature operating systems, for example, power producing apparatus is significantly dependent upon the development of joining techniques. Brazing has many advantages over other joining processes in the construction of lightweight, high performance mechanisms for high temperature service. The development of brazing materials suitable to braze refractory metals' alloys and superalloys within temperature ranges which will not detrimentally affect such alloys themselves, must parallel structural alloy development or else effective utilization will lag significantly behind. Although a number of high temperature brazing alloys, particularly of the nickel base or high nickel type, have been reported, such brazing alloys either lack sufficient high operating temperature stability or they detrimentally attack high temperature structural alloys.

It is a principal object of this invention to provide a Ni-Cr-Pd type brazing alloy which has high temperature operating characteristics, good mechanical properties and is compatible with superalloys.

Another object is to provide a Ni-Cr-Pd type brazing alloy which can be brazed in a temperature range lower than that which detrimentally affects most high temperature structural alloys and which brazing alloy includes additional compatible elements to lower the melting point.

Still a further object is to provide a relatively low palladium and hence low cost Ni-Cr-Pd type brazing alloy.

These and other objects will become more apparent from the description taken in connection with the accompanying drawing which is the liquidus isotherm diagram of a Ni-Cr-Pd ternary system locating the alloy of this invention.

The alloy of this invention, in one form, comprises in percent by weight about 15–40 chromium, about 5–35 palladium with the balance essentially nickel. In another form, the alloy of this invention contemplates the addition of at least one element of the group Si, Ta, Cb, Fe, B, Sb, Mn, In and Au to lower the melting point.

Although large percentages of the element palladium have been alloyed with such elements as nickel, platinum, manganese, tin, silicon, and even small amounts of chromium, the unexpected advantages as a high temperature brazing alloy to be gained from alloying the elements chromium, palladium and nickel within the range suggested by the parallelogram ABCD of the drawing has heretofore been unrecognized.

Referring to the drawing, the broken lines represent liquidus isotherms existing in the Ni-Cr-Pd ternary system. To one developing brazing alloys intended to be brazed at about 1000–1150° C., alloys within the area on the ternary diagram between about 35–80% by weight palladium would appear to be the most logical to investigate because of their lower melting points. However, the present invention points out the unexpected advantages to be gained through the use of a brazing alloy including between about 5% and 35% by weight palladium. The alloy of this novel range has more useful properties and can have its melting point adjusted more readily through the use of certain additive elements. In addition, it has been discovered that below about 15% by weight chromium, in a Ni-Cr-Pd system, including about 5–35% by weight Pd, high temperature oxidation resistance is unexpectedly and drastically reduced. Above about 40% by weight chromium in such a system, ductility of the alloy is drastically reduced. Between about 15–40% by weight chromium, according to this invention, there are unexpected significant interrelationships between the elements nickel, chromium and palladium to result in an unusual alloy system.

The alloy forms represented in Table I are typical of those which were melted and tested to define the usefulness of the alloy range suggested by the parallelogram ABCD in the drawing. These alloy forms were prepared by non-consumable electrode melting into ingots in a vacuum purged helium atmosphere chamber. The ingots were then machined into chips.

TABLE I

| Alloy No. | Percent by weight | | | Melting point °F. |
| --- | --- | --- | --- | --- |
| | Ni | Cr | Pd | |
| 11 | Bal. | 23 | 44 | 2,285 |
| 37 | Bal. | 34 | 39 | 2,280 |
| 38 | Bal. | 43.5 | 36.5 | 2,280 |
| 39 | Bal. | 43.5 | 25 | 2,280 |
| 41 | Bal. | 53 | 10 | 2,340 |
| 42 | Bal. | 14.9 | 24.5 | 2,290 |
| 43 | Bal. | 19.9 | 31.2 | 2,275 |
| 44 | Bal. | 20.4 | 22.7 | 2,295 |
| 31 | Bal. | 20 | 20 | 2,350 |
| 45 | Bal. | 19.7 | 14.9 | 2,315 |
| 27 | Bal. | 20 | 10 | 2,350 |
| 30 | Bal. | 20 | 5 | 2,370 |
| 46 | Bal. | 25 | 21 | 2,295 |
| 40 | Bal. | 35.5 | 21 | 2,300 |
| 47 | Bal. | 34 | 20 | 2,290 |

The alloy forms in Table I are divided into two groups: numbers 11, 37, 38, 39, 41 and 42 having properties which negate their use as high temperature brazing materials, and the remainder of the numbers in that Table I having significantly different properties from those in the unsatisfactory group and which are considered useful as high temperature brazing materials.

Referring to the drawing on which are included points representing the alloy forms included in Table I, it was discovered that as the palladium content is increased, compatibility with refractory alloys such as Mo, W, Ta, Re, etc., but not Cb, was increased. However, as might be expected from a study of the isotherms represented by broken lines in the drawing, increasing palladium content in the presence of less than about 30% by weight chromium lowered the melting point. In addition, strength and compatibility with nickel base structural alloys decreased with an increase in palladium. However, the mechanical properties of such alloys as 11, a current commercially available brazing alloy, and 37 were relatively poor, thus showing the detrimental effect of the inclusion of more than about 35% by weight palladium in a Ni-Cr-Pd system for use as brazing alloys. Alloys 11 and 37, which are in the 40–45% by weight palladium range, are particularly undesirable for joining nickel base or high nickel alloys because of the tendency to draw nickel into solution, resulting in excessive erosion. The alloy 11 had only fair ductility. Although it includes about 23% by weight chromium, alloy 11 was found to be severely internally oxidized.

By increasing the chromium content of the alloy of this invention, the alloy strength increased, with a slight decrease in compatibility with refractory metals. It might be expected that increased chromium content would improve oxidation resistance. However, it has been found that an unexpected increase in oxidation resistance occurs between about 15 and 20% by weight chromium at a given palladium level. This is shown by a comparison of alloys 42 and 44 in the following Table II.

TABLE II

*Oxidation Test—249 Hours*

[In moving air @ 2200° F.]

| Alloy: | Diameter loss (inches) (⅛" round bar) |
|---|---|
| 42 | 0.014 |
| 43 | 0.003 |
| 44 | 0.003 |
| 45 | 0.002 |
| 46 | 0.003 |
| 47 | 0.001 |

The significance of the addition of chromium in the range of 15–20% by weight is certainly unexpected. Although alloy 47, including about 35% by weight chromium, has greater oxidation resistance than does alloy 44, including about 20% by weight chromium at about the same palladium level, the difference in oxidation resistance is not as great as that between alloys 42 and 44 having only a 5% by weight difference in chromium. However, despite the fact that an increase in oxidation resistance may be achieved by such additions of chromium, the brittle characteristics typical of chromium base alloys which were found in alloys 38, 39 and 41, has shown that the inclusion of chromium in amounts greater than about 40% by weight in the palladium range of this Ni–Cr–Pd system results in an excessively brittle brazing alloy. Even though alloys 38 and 39 have lower melting points than most alloys within the parallelogram ABCD, their poor mechanical properties negate usefulness as brazing alloys.

The poor oxidation resistance of alloy 42 represented itself as deep integranular oxidation. In view of its relatively low percentage of chromium, alloy 42 has surprisingly low ductility as shown by tensile elongation tests from room temperature to 2200° F. On the other hand, alloy 43, 44, 45 and 46 have good ductility and alloy 47 has excellent ductility. All of the alloys 43–47 have good mechanical strength up to about 2200° F. as determined from investment cast bars, with alloy 47 showing better strength, ductility and oxidation resistance as might be expected from the higher chromium content. Alloy form 43, which is within the area near the top of the palladium range of this invention, has a very slow diffusion rate with refractory metals except columbium. Alloy forms in that composition area have good compatibility with such refractory materials and avoid formation of a brittle intermetallic phase which can be a weak point in an otherwise strong bond.

The significant features and advantages of the alloy of this invention within the range, in percent by weight, of about 15–40 chromium, about 5–35 palladium with the balance essentially nickel have been shown above. Nevertheless, brazing temperature tests disclosed that the melting points of the basic Ni–Cr–Pd alloy would have to be depressed for some applications. For example, alloys 43–47 are useful for 2200° F. operation but must be brazed at a temperature of about 2400° F., too high for practical use with many superalloys. A more universal application of the alloy of this invention over a broader brazing temperature range required melting point depression. A study of a large number of metallic elements as potential addition elements to the basic Ni–Cr–Pd alloy of this invention disclosed that useful brazing alloys having lower melting points can be obtained through the addition of one or more of the elements Sb, Si, In, Au, Mn, Cb, Ta, Fe, B, Ge, Be, Al, Li and P. The composition ranges tested included, by weight, up to about 5% for Sb and Si; up to about 10% for In, Au, Mn, Cb and Ta; up to about 20% for Fe and up to about 1% for B. The following Table III includes ranges of some alloys melted to determine melting point depression and includes reference to alloy forms 46 and 47 upon which some of the modified alloys were based.

TABLE III

*Elements for Melting Point Depression*

| Alloy number | Percent by weight (balance Ni) | | | Avg. melting point (° F.) |
|---|---|---|---|---|
| | Cr | Pd | Other | |
| 46 | 25 | 21 | | 2,295 |
| 47 | 34 | 20 | | 2,290 |
| 48–52 | 21–32 | 16–20 | 5–20 Fe | 2,285 |
| 53–55 | 31–33 | 18–20 | 2–8 In | 2,270 |
| 56 | 31 | 18 | 8 Au | 2,270 |
| 57, 58 | 32–33 | 19–20 | 2–5 Sb | 2,230 |
| 108–110 | 20–25 | 5–10 | 5–10 Ta | 2,200 |
| 61, 62 | 25–34 | 20–21 | 0.2 B | 2,160 |
| 69, 67 | 30–40 | 18–23 | 10 Mn | 2,150 |
| 66 | 32 | 19 | 5 Sb, 0.2 B | 2,100 |
| 69, 70 | 24–33 | 20–21 | 2 Si | 2,100 |
| 63 | 30 | 18 | 10 Mn, 0.2 B | 2,095 |
| 144–147 | 35 | 5–10 | 2–4 Si, 6–10 Cb | 2,050 |
| 75 | 28 | 30 | 2 Si | 2,000 |
| 77 | 22 | 21 | 4 Si | 2,000 |
| B1 | 28 | 22 | 5 Si | 1,950 |
| B2 | 33 | 25 | 5 Si | 1,950 |
| B3 | 32–34 | 23–25 | 3.8–4.3 Si | 1,950 |

As shown by Table III, the elements preferred and most significant in the depression of the melting point of the basic alloy of this invention are Sb, Ta, B, Mn, Si, Cb and their combinations. Particularly useful alloy forms were 144–147, 75, 77, B1, B2 and B3 because of their lower brazing temperature range and because each group has unique characteristics particularly advantageous in solving different difficult brazing problems. For example, alloys within the range of 144–147 are particularly useful with nickel base alloys. One super alloy used in testing of the alloy of this invention was a cast nickel base alloy including, in percent by weight, 14–17 Cr, 3–4 Ti, .05–.10 B, 3.6–5 Al, 4–7 Mo, 4–6 Fe, with the balance essentially nickel. The addition of 6–10% by weight columbium to a Ni–Cr–Pd–Si brazing alloy averted incipient melting of the nickel base alloy's cast structure during brazing. On the other hand, such alloy forms as 75 and 77 have a melting phase as low as about 1790° F. Hence, they are particularly useful to braze those materials not subject to such incipient melting or which require lower brazing temperatures.

Another particularly useful form of the alloy of this invention is that represented by the range of B1–B3. Although alloys 75 and 77 of that Ni–Cr–Pd–Si type were found to be extremely useful as brazing materials, it was disclosed in a series of brazing tests that a similar alloy within the range of B1–B3 was more easily controlled during brazing and could be consistently brazed at a brazing temperature of about 2150° F. Alloy forms of the 75–77 type required brazing temperatures of 2200° F. or above. Thus the use of alloys in the range of B1–B3 would allow the brazing at about 2150° F. of superalloys which may be detrimentally affected by even short exposures to 2200° F. temperatures. In addition, a brazing alloy within the B1–B3 range is the best type currently known which can braze a structural alloy of the type including in percent by weight 18–20 Cr, 10–12 Co, 9–10.7 Mo, 3–3.3 Ti, 1.5–1.8 Al, up to .003 B with the balance essentially nickel without detrimental reaction at the interface between the brazing alloy and the structural alloy.

Although the alloy of this invention has been described in connection with specific examples and modifications, it will be understood by those skilled in the art of metallurgy the modifications and variations of which this invention is capable in order to evolve a specific brazing alloy to solve a particular metallurgical problem in brazing.

What is claimed is:

1. A high temperature brazing alloy comprising in percent by weight about 19–38 chromium, about 10–32 palladium, with the balance essentially nickel.

2. A high temperature brazing alloy comprising in percent by weight 19–28 chromium, 10–32 palladium, with the balance essentially nickel.

3. A high temperature brazing alloy comprising in percent by weight 34 chromium, 20 palladium, with the balance essentially nickel.

4. A high temperature brazing alloy consisting of in percent by weight 19–38 chromium, 10–32 palladium, up to 5 Sb, up to 10 Ta, up to 1 B, up to 5 Si, up to 10 Cb, with the balance nickel and incidental impurities.

5. A high temperature brazing alloy consisting of in percent by weight about 34–36 chromium, about 5–10 palladium, 2–4 silicon, about 6–10 columbium, with the balance nickel and incidental impurities.

6. A high temperature brazing alloy consisting of in percent by weight 22–28 chromium, 21–30 palladium, 2–4 silicon, with the balance nickel and incidental impurities.

7. A high temperature brazing alloy consisting of in percent by weight 33–38 chromium, 22–25 palladium, 3–5 silicon, with the balance nickel and incidental impurities.

8. A high temperature brazing alloy consisting of in percent by weight 32–34 chromium, 23–25 palladium, 3.8–4.3 silicon, with the balance nickel and incidental impurities.

References Cited in the file of this patent

UNITED STATES PATENTS

| | | |
|---|---|---|
| 1,832,307 | Kingsbury | Nov. 17, 1931 |
| 2,226,076 | Rutledge | Dec. 24, 1940 |
| 2,226,079 | Spanner | Dec. 24, 1940 |
| 2,815,282 | Rhodes et al. | Dec. 3, 1957 |
| 2,856,281 | Cremer et al. | Oct. 14, 1958 |
| 2,900,251 | Evans et al. | Aug. 18, 1959 |
| 2,944,891 | Cape | July 12, 1960 |

FOREIGN PATENTS

| | | |
|---|---|---|
| 18,212 of 1913 | Great Britain | July 9, 1914 |
| 48,622 | Germany | Sept. 9, 1899 |
| 684,186 | Germany | Nov. 23, 1939 |
| 68,795 | Austria | May 25, 1915 |

OTHER REFERENCES

Evans: Battelle Technical Review, vol. 5, No. 8, August 1956, pages 8–12. Published by the Battelle Memorial Institute, Columbus, Ohio.